United States Patent
Bergman et al.

(10) Patent No.: US 9,135,499 B2
(45) Date of Patent: Sep. 15, 2015

(54) PREDICTIVE THEFT NOTIFICATION FOR THE PREVENTION OF THEFT

(71) Applicants: Adam S. Bergman, Boca Raton, FL (US); David R. Noone, Delray Beach, FL (US)

(72) Inventors: Adam S. Bergman, Boca Raton, FL (US); David R. Noone, Delray Beach, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 150 days.

(21) Appl. No.: 13/785,055

(22) Filed: Mar. 5, 2013

(65) Prior Publication Data

US 2014/0254890 A1 Sep. 11, 2014

(51) Int. Cl.
- *G06K 9/00* (2006.01)
- *G08B 13/24* (2006.01)
- *G08B 31/00* (2006.01)
- *G08B 13/196* (2006.01)

(52) U.S. Cl.
CPC .......... *G06K 9/00228* (2013.01); *G08B 13/248* (2013.01); *G08B 31/00* (2013.01); *G08B 13/19697* (2013.01)

(58) Field of Classification Search
USPC ........... 382/118, 224, 278, 282; 348/143, 161
See application file for complete search history.

(56) References Cited

U.S. PATENT DOCUMENTS

| | | | |
|---|---|---|---|
| 6,437,819 B1 * | 8/2002 | Loveland | 348/143 |
| 7,528,881 B2 * | 5/2009 | Ahiska | 348/335 |
| 7,729,532 B2 * | 6/2010 | Tedesco et al. | 382/159 |
| 8,081,817 B2 * | 12/2011 | Tedesco et al. | 382/159 |
| 8,094,026 B1 * | 1/2012 | Green | 340/572.1 |
| 8,401,233 B2 * | 3/2013 | Tedesco et al. | 382/103 |
| 8,427,538 B2 * | 4/2013 | Ahiska | 348/143 |
| 8,831,677 B2 * | 9/2014 | Villa-Real | 455/552.1 |
| 2004/0240542 A1 | 12/2004 | Yeredor et al. | |
| 2009/0027493 A1 | 1/2009 | Amar et al. | |
| 2010/0056722 A1 * | 3/2010 | Thomas et al. | 525/123 |
| 2012/0229649 A1 | 9/2012 | Pederson | |

FOREIGN PATENT DOCUMENTS

| | | | |
|---|---|---|---|
| WO | 2004034347 A1 | 4/2004 | |
| WO | 2012166211 A1 | 12/2012 | |
| WO | 2013169786 A2 | 11/2013 | |

* cited by examiner

*Primary Examiner* — Wesley Tucker
(74) *Attorney, Agent, or Firm* — Robert J. Sacco, Esq.; Carol E. Thorstad-Forsyth, Esq.; Fox Rothschild LLP

(57) ABSTRACT

Predictive theft notifications are used to coordinate appropriate responses to persons who are likely to commit acts of theft. Image data is generated and processed in a computer processing device to recognize the presence of a facial image comprising a face of a person. An analysis is performed of data representative of the facial image to determine a biometric match relative to one or more biometric models of facial images stored in a database. Based on this analysis, at least one predictive notification is generated with regard to a future potential theft of merchandise from the secured facility. The predictive notification is generated based upon a determination of the biometric match.

12 Claims, 7 Drawing Sheets

PREDICTIVE THEFT NOTIFICATION FOR THE PREVENTION OF THEFT

BACKGROUND OF THE INVENTION

1. Statement of the Technical Field

The inventive arrangements relate to methods and systems for facial recognition and more particularly to improved methods and systems for facial recognition in areas which utilize electronic article surveillance (EAS) systems.

2. Description of the Related Art

Increasingly, retail stores need to combat organized retain crime (ORC). An ORC scenario typically involves a group of thieves who will steal large amounts of merchandise in one visit. Such persons will commonly trigger an EAS alarm when they leave the store with merchandise having an attached active EAS tag, but an alarm at such time may be too late. Retail store clerks are poorly equipped to deal with aggressive groups of persons intent on stealing, and in fact are frequently forbidden by employer guidelines from taking any action beyond verbal contact. Moreover, an EAS alarm initiated as a group of thieves is rushing out the exit is often too late to be of much use from a theft prevention standpoint.

Another EAS problem involves certain individuals who repeatedly engaging in shoplifting activities. Such individuals may initiate an EAS alarm as they are rushing out an exit door, but there is little a store clerk can do at such time to deal with the problem. Notably, the same person can subsequently travel to a second store location (sometimes of the same retail store chain) and continue his/her illicit activity because the person will not be known at the second store.

Electronic article surveillance (EAS) systems can include imaging devices to provide enhanced performance. For example, International Publication No. WO 2004/034347 discloses a system in which video surveillance is used with an EAS system. An EAS system incorporating video sensors is also described in U.S. Pat. No. 7,961,096. In that system, a video analysis process is used in combination with the EAS system. The video analysis process is capable of detecting the presence, location and motion of objects. To this end, it is disclosed that the video sensors can be positioned overhead of a pair of EAS pedestals or can be integrated directly into the pedestals (e.g. on top of a pedestal).

In certain RFID tag systems a trigger event (e.g. an RFID tag detection) can be used to determine when image media is captured or processed. For example, U.S. Publication No. 2012/0056722 discloses an RFID system in which a trigger event can automatically trigger certain processing, such as facial recognition processing. When an RFID badge is detected the system can automatically perform facial recognition to determine whether the face of a person in a captured image matches the person associated with the tagged badge ID.

SUMMARY OF THE INVENTION

The invention concerns a method for generating a predictive theft notification at a secured facility, such as a retail store. Predictive theft notifications can be used to coordinate appropriate responses to persons who are likely to commit acts of theft. The method involves generating image data using at least one imaging device and then processing the image data in a computer processing device. The processing is performed to recognize the presence of a facial image comprising a face of a person within the image data. The method further involves performing an analysis of data representative of the facial image to determine a biometric match relative to one or more biometric models of facial images stored in a database. Based on this analysis, at least one predictive notification is generated with regard to a future potential theft of merchandise from the secured facility. The predictive notification is generated based upon a determination of the biometric match.

According to another aspect, the invention includes a system for generating a predictive theft notification at a secured facility. The system includes at least one imaging device arranged to generate image data. The system also includes one or more computer processing devices. The one or more computer processing devices are configured to recognize the presence of a facial image comprising a face of a person within the image data. The one or more computer processing devices also perform an analysis of data representative of the facial image. The purpose of this analysis is to determine a biometric match relative to one of the biometric models of facial images stored in a database. If a biometric match is identified in this step, then at least one predictive notification is generated to warn of a future potential theft of merchandise from the secured facility.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
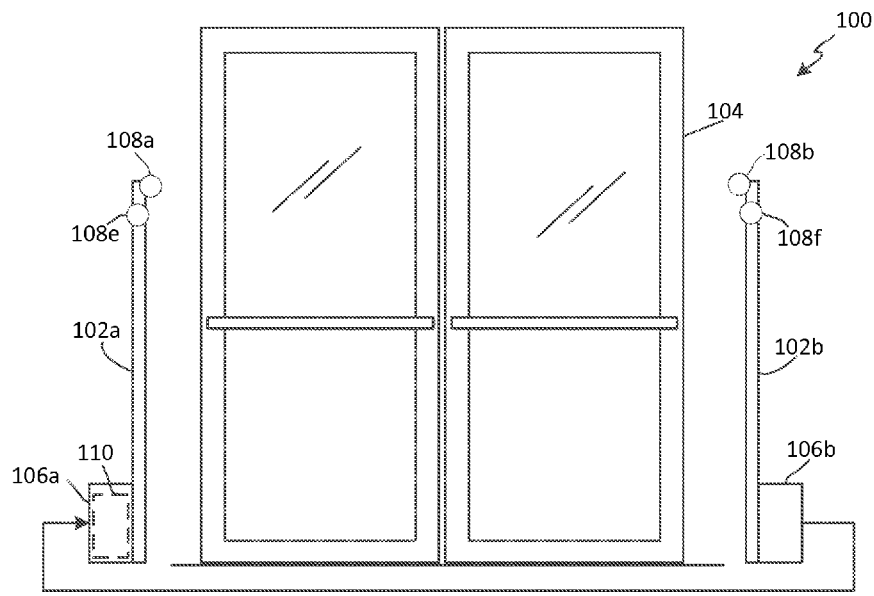
FIG. 1 is a side view of an EAS detection system, which is useful for understanding the invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The operation of an EAS system can be improved by including advanced facial identification capability. For example, an EAS system can be improved by facilitating identification of specific individuals by comparison of their facial features to known biometric models which are stored in a database. In such a scenario, a database can be created which contains information suitable for not just recognizing faces (facial recognition), but for actually identifying specific known individuals (facial identification) based on facial features. A database as described herein is populated with information suitable to facilitate facial identification. The facial information is assembled by using one or more imaging devices, which can be located, for example, at one or more EAS pedestals. When an EAS alarm is detected, facial image information for the person who triggered the alarm is captured and stored in the database. Subsequently, if the same person enters such retail establishment at a later date, his facial image can be captured as he/she enters, and can be compared against the facial information stored in the database. The person will then be identified as a person previously known to have triggered an EAS alarm. At this point, an alert can be generated. The alert can inform the store clerk that the person is known to have previously triggered an EAS alarm. In response, the clerk can notify police or appropriate store security personnel who are equipped to deal with situations involving a potential theft. Alternatively, the system can configured to automatically notify police or store security personnel. The presence of security personnel or police at the retail establishment can discourage any potential thievery, and will facilitate a suitable enforcement response in the event any theft may be attempted. Accordingly, the EAS system described herein can function in a predictive manner to prevent theft, by identifying in advance persons who are known to have triggered EAS alarms in the past.

A system as described herein has many advantages, but there are significant challenges associated with the implementation of an EAS system that provides identification of a particular person based on comparison of facial features to information contained in a database. One such problem involves management of communication bandwidth. A retail store environment can have numerous entries and exits, and each such entry or exit will generally be monitored by one or more EAS sensing devices. To fully integrate facial identification (i.e. not just facial recognition) with the EAS system, one or more imaging devices (e.g. video cameras) are needed to monitor a volume of space associated with each EAS sensing device. At a minimum, at least one imaging device or video camera will be needed for each entry/exit that that is to be monitored at the facility.

Facial recognition and identification requires significant processing and database resources. Accordingly, it is advantageous to perform such identification processing at a single centralized location at the facility or elsewhere. But centralized processing of images to discern facial images and facilitate actual identification of individuals based on such images can require continuous communication of streaming video image data from each camera location to the central server. Once this video data is received, the centralized server must process each video stream to identify human faces, select one or more facial images containing an image of a person's face, and then analyze the images to facilitate identification of that person. A key limitation in such a system is the substantial communication bandwidth required to transmit video data from all of the various imaging devices to the centralized server facility. The bandwidth problem is particularly acute in those scenarios where the video image data is communicated wirelessly from the video imagers to the central server which performs facial identification processing.

In order to overcome the above-described problem, there is disclosed herein a method for performing predictive electronic article surveillance which is enhanced by means of facial recognition. More particularly, electronic article surveillance is enhanced by identifying persons in an EAS surveillance zone by using a facial recognition algorithm executing in a computer processing element that is located in or near the EAS pedestal. Information representing a facial image is communicated to a central server only after a facial image is discerned within a video image. The image data (i.e., data representing a facial image which has been detected) can be automatically communicated once a face is detected, or can be selectively communicated based on certain EAS criteria as determined by an EAS pedestal. For example, in some scenarios, the image can be communicated only when an EAS tag is detected within an EAS detection zone.

An embodiment of the invention involves sensing at least one parameter at an EAS pedestal to detect a presence of an EAS tag. Concurrently with such sensing, image data is generated at the EAS pedestal using one or more imaging devices. The imaging device(s) are mounted in a suitable location for observing an EAS sensing area. For example, one or more imaging devices can be mounted on the EAS pedestals which are used to monitor a particular entry or exit of a facility. The image data is processed in a computer processing device located at the EAS pedestal. For purposes of the present invention, the computer processing device is considered to be at the EAS pedestal if it physically located within the pedestal or is nearby (e.g. in the ceiling above the pedestal or a short distance away). The processing at the EAS pedestal is performed to facilitate recognition of a facial image (comprising a face of a person) within the image data being generated by the one or more imaging devices. Notably, processing at this stage does not involve identification of a particular individual, but rather a simple recognition that a person's face is present within an image. Only then, as a result of such processing, data representative of a facial image is communicated (in all cases or selectively) to a server at a location remote from the EAS pedestal. Additional actions can also be performed at the EAS terminal responsive to the aforementioned processing to facilitate operations of the EAS terminal.

Figure 3:
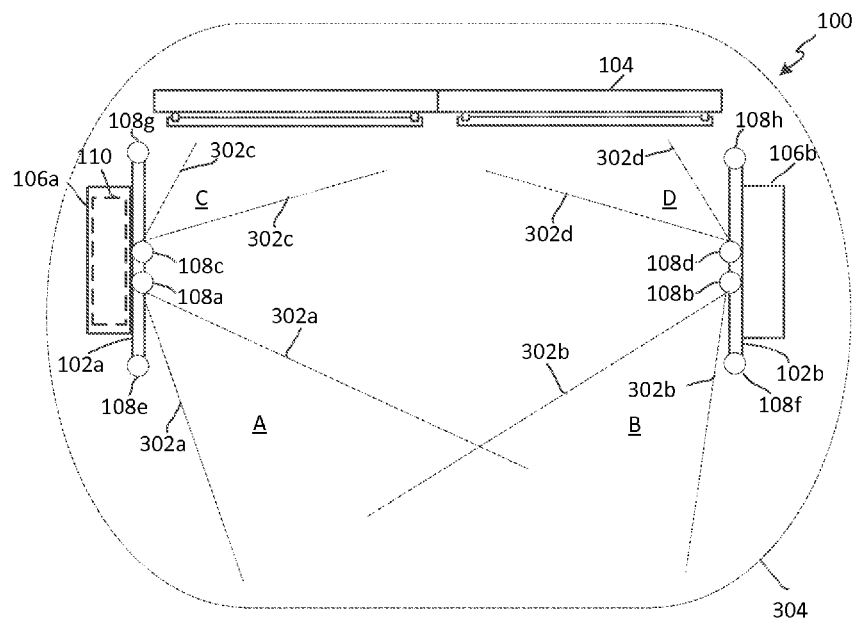
FIG. 3 is a top view of the EAS detection system in FIG. 1, which is useful for understanding a EAS detection zone and a camera field of view.
Figure 4:
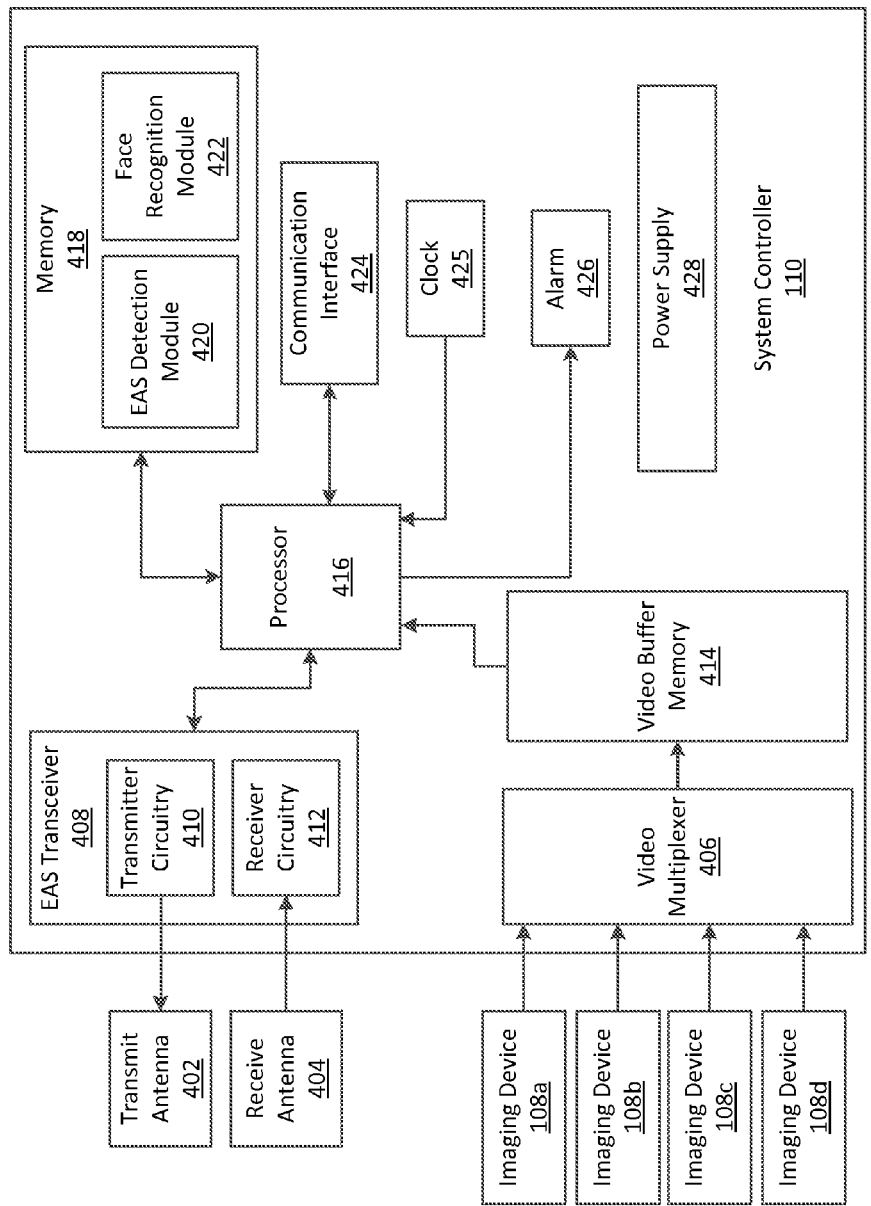
FIG. 4 is a block diagram that is useful for understanding an arrangement of an EAS controller which is used in the EAS detection system of FIGS. 1 and 2.

Referring now to the drawings figures in which like reference designators refer to like elements, there is shown in FIGS. 1A, 3, and 4 an exemplary EAS detection system 100. The EAS detection system will be positioned at a location adjacent to an entry/exit 104 of a secured facility (e.g. a retail store facility). The EAS system 100 uses specially designed tags (not shown) which are applied to store merchandise or other items which are stored within a secured facility. The tags can be deactivated or removed by authorized personnel at the secure facility. For example, in a retail environment, the tags could be removed or deactivated by store employees. When an active tag is in an EAS detection zone 304 near the entry/exit, the EAS detection system 100 will detect the presence of such tag and will sound an alarm or generate some other suitable EAS response. Accordingly, the EAS detection system 100 is arranged for detecting and preventing the unauthorized removal of articles or products from controlled areas.

A number of different types of EAS detection schemes are well known in the art. For example, known types of EAS detection schemes can include magnetic systems, acousto-magnetic systems, radio-frequency type systems and microwave systems. For purposes of describing the inventive arrangements in FIGS. 1A, 3, and 4, it shall be assumed that the EAS detection system 100 is an acousto-magnetic type system. Still, it should be understood that the invention is not limited in this regard and other types of EAS detection methods can also be used with the present invention.

Figure 2:
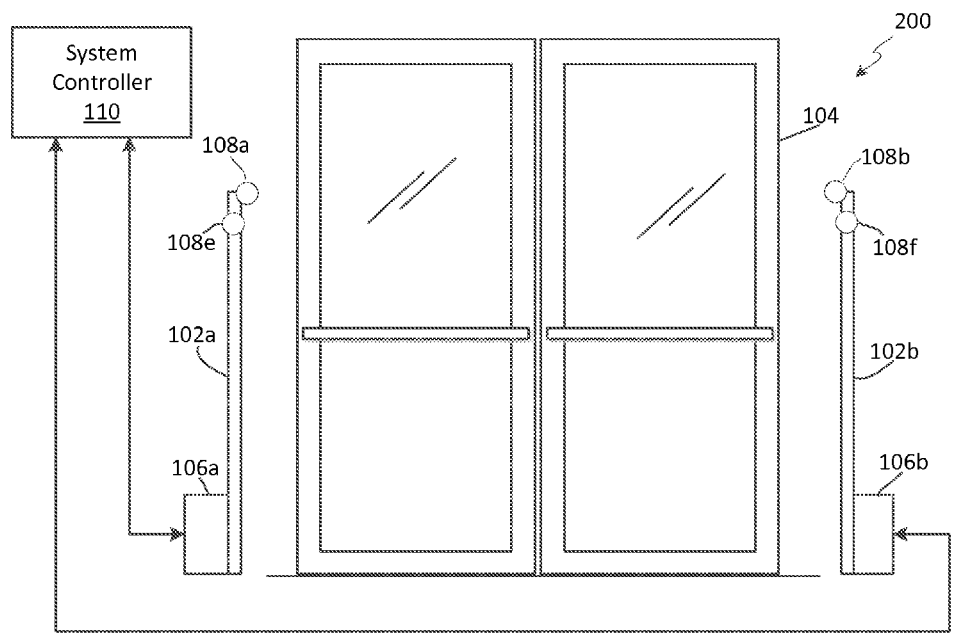
FIG. 2 is a side view of an alternative embodiment of the EAS detection system in FIG. 1.

The EAS detection system 100 includes a pair of pedestals 102a, 102b, which are located a known distance apart at opposing sides of entry/exit 104. The pedestals 102a, 102b are stabilized and supported by a base 106a, 106b. Pedestals 102a, 102b will generally include an antenna suitable for aiding in the detection of the special EAS tags as described herein. For example, pedestal 102a can include a transmit antenna 402 and pedestal 102b can include an EAS receive antenna 404 as shown in FIG. 4. The antennas located in the pedestals 102a, 102b are electrically coupled to a system controller 110, which controls the operation of the EAS detection system to perform EAS functions as described herein. In some embodiments of the invention, a single pedestal 102a can be used for the EAS detection system 100 instead of two pedestals shown. In such embodiments, a single antenna can be provided in the pedestal 102a. The single antenna is configured for transmitting an exciter signal for the EAS tags and for detecting the response of such EAS tags. The single antenna is selectively coupled to the EAS receiver and the EAS transmitter in a time multiplexed manner so as to facilitate each function The system controller can be located within a base of one of the pedestals as shown in FIG. 1. Alternatively, the system controller can be located within a separate chassis at a location within the immediate area surrounding the pedestals. For example, the system controller 110 can be located in a ceiling just above or adjacent to the pedestals. Such locations are deemed to be at the EAS pedestal for purposes of the present invention. An arrangement in which the EAS controller is located in a separate housing, but still local (e.g. within 5 to 50 feet) of the EAS pedestal, is illustrated in FIG. 2. For purposes of the present invention, a system controller will be deemed to be located at the EAS pedestal if it is located within the pedestal or is located within this distance. According to yet another embodiment, the functions of the system controller 110 can be distributed among processing elements (not shown) which are disposed in the pedestal (e.g. pedestal 102a) and in a separate chassis at a location within the immediate area surrounding the pedestal as described herein. A system controller 110 with distributed elements as described will also be deemed for purposes of this invention to be located at the EAS pedestal.

EAS detection systems are well known in the art and therefore will not be described here in detail. However, those skilled in the art will appreciate that a transmit antenna 402 of an acousto-magnetic type EAS detection system is used to generate stimulus signals. The stimulus signals cause a mechanical oscillation of a strip (e.g. a strip formed of a magnetostrictive, or ferromagnetic amorphous metal) contained in a tag within a detection zone 304. As a result of the stimulus signal, the tag will resonate and mechanically vibrate due to the effects of magnetostriction. This vibration will continue for a brief time after the stimulus signal is terminated. The vibration of the strip causes variations in its magnetic field, which can induce an AC signal in the receiver antenna. This induced signal is used to indicate a presence of the strip within the detection zone 304.

One or more imaging devices 108a, 108b, 108c, 108d are provided to capture images of the faces of people who are entering and/or leaving through the entry/exit 104. These imaging devices can be located in any suitable location, but are preferably located on the pedestals 102a, 102b. For example, the imaging devices 108a, 108b, 108c, 108d can be located at a top or upper portion of the pedestals 102a, 102b as shown in FIGS. 1-3. The imaging devices can be arranged for capturing images of persons entering or leaving the premises of the secured facility. Accordingly, imaging device 108a, 108b can be arranged to capture images of persons leaving the premises, whereas imaging devices 108c, 108d can be arranged to capture images of persons entering the premises. This concept is illustrated in FIG. 3, which shows that imaging device 108a will have a field of view "A" indicated by lines 302a, and imaging device 108b will have a field of view "B" indicated by lines 302b. Similarly, imaging device 108c will have a field of view "C" indicated by lines 302c, and imaging device 108d will have a field of view "D" indicated by lines 302d.

Additional imaging devices can be provided on the pedestals 102a, 102b without limitation. For example imaging devices 108e, 108f, and 108g, 108h can be provided respectively at the front and rear edges of the pedestals as shown in FIGS. 1 and 2. In order to avoid obscuring the invention, fields of view for the additional imaging devices are not shown. However, those skilled in the art will appreciate than the imaging devices 108e, 108f, 108g, 108h can have a field of view that is advantageous for obtaining facial image data. For example, the imaging devices 108e, 108f, 108g, 108h can each have a field of view which is chosen to capture facial image data of persons as they approach the EAS detection zone 304.

Referring once again to FIG. 4, there is provided a block diagram that is useful for understanding the arrangement of the system controller 110. The system controller comprises a computer processing device including processor 416. The processor 416 can be a central processing unit (CPU)), and can optionally include a dedicated video processing device (not shown) to facilitate image processing as described herein. The system controller also includes a computer readable storage medium, such as memory 418 on which is stored one or more sets of instructions (e.g., software code) configured to implement one or more of the methodologies, procedures or functions described herein. The instructions (i.e., computer software) can include an EAS detection module 420 to facilitate EAS detection and a face recognition module 422 to facilitate recognition of a human face contained within an image. These instructions can also reside, completely or at least partially, within the processor 416 during execution thereof.

The system also includes an EAS transceiver 408, including transmitter circuitry 410 and receiver circuitry 412. The transmitter circuitry is electrically coupled to transmit antenna 402 and the receiver circuitry 412 is electrically connected to receive antenna 404 as shown. As noted above, a single common antenna can be used in some embodiments of the invention for both receive and transmit operations. In such embodiments, a suitable multiplexing arrangement is provided to facilitate both receive and transmit operation.

The system controller 110 can also include one or more circuit components to facilitate the video processing actions as hereinafter described. As such, the system controller 110 can include a video multiplexer 406 for receiving and routing video streams from a plurality of video imaging devices 108a, 108b, 108c, and 108d. The system controller 110 can also include a video buffer memory coupled to the video multiplexer for storing and buffering video image data which is to be processed in the processor 416.

Additional components of the system controller 110 can include a communication interface 424 configured to facilitate wired and/or wireless communications from the system controller 110 to a remotely located EAS system server as hereinafter described. The system controller can also include a real-time clock, which is used for timing purposes, an alarm 426 (e.g. an audible alarm, a visual alarm, or both) which can be activated when a tag is detected within the EAS detection zone 304. A power supply 428 provides necessary electrical power to the various components of the system controller 110. The electrical connections from the power supply to the various system components are omitted in FIG. 4 so as to avoid obscuring the invention.

Figure 5:
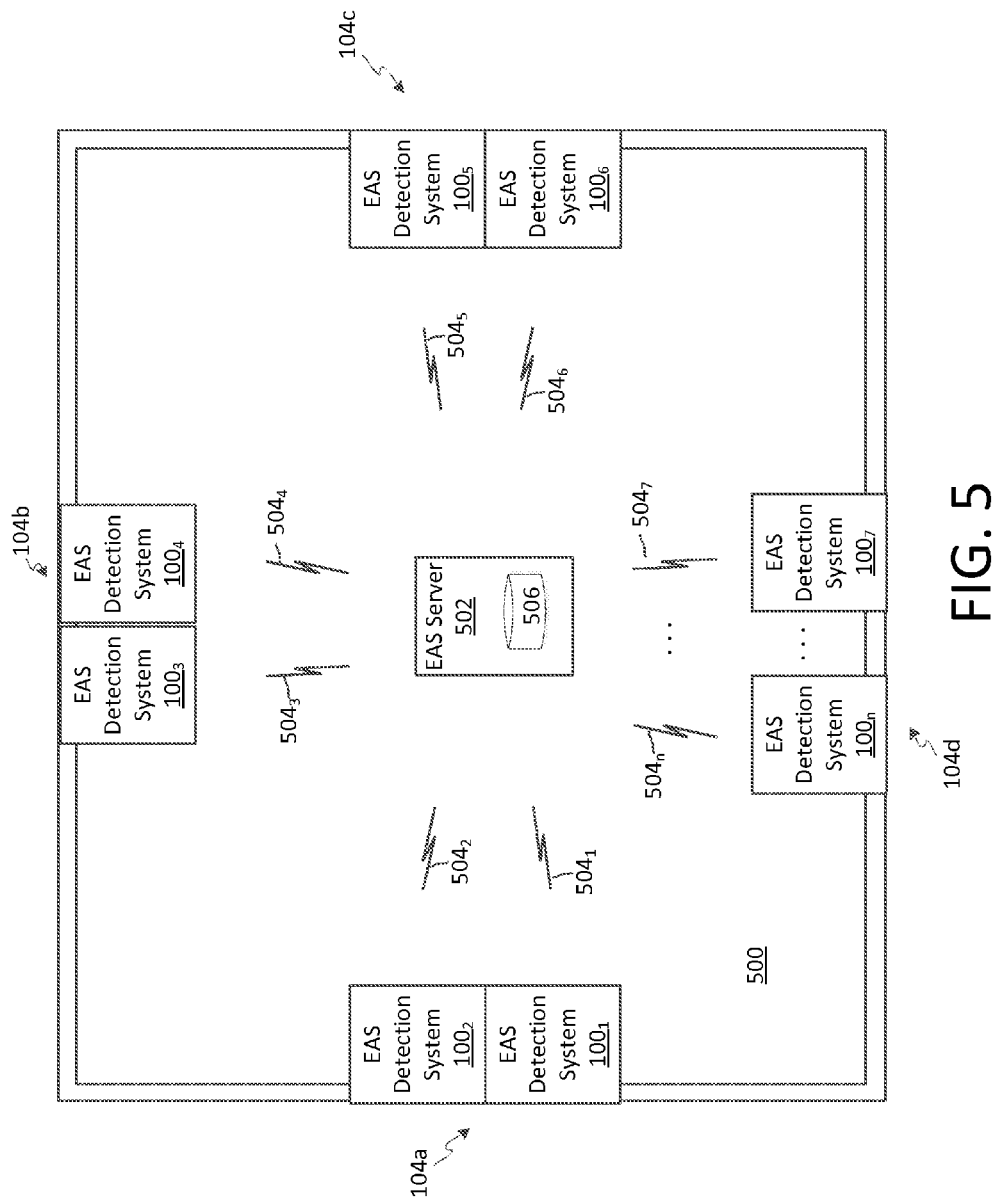
FIG. 5 is diagram that is useful for understanding how a plurality of EAS detection systems shown in FIG. 1 can be integrated into a secured facility which includes an EAS server.

Referring now to FIG. 5, there is provided a drawing of a secured facility 500 which has several points of entry/exit 104a, 104b, 104c, 104d. One or more EAS detection systems $100_1$-$100_n$ is provided at each point of entry/exit to prevent unauthorized removal of tagged items from the premises. Each EAS detection system $100_1$-$100_n$ is similar to the EAS detection system described herein with respect to FIGS. 1-4. The EAS detection systems $100_1$-$100_n$ each communicates with an EAS server 502 to coordinate EAS operations and facilitate operation of a facial identification system. For example such communications can be facilitated by means of a plurality of communication links $504_1$-$504_n$. Communication links $504_1$-$504_n$ can be comprised of any suitable type of wired or wireless communication link. For example, the communication links can be comprised of a wireless local area network utilizing a conventional well known wireless LAN standard, such as IEEE 802.11. Still, the invention is not limited in this regard and other types of communication links can also be used for this purpose.

Figure 6:
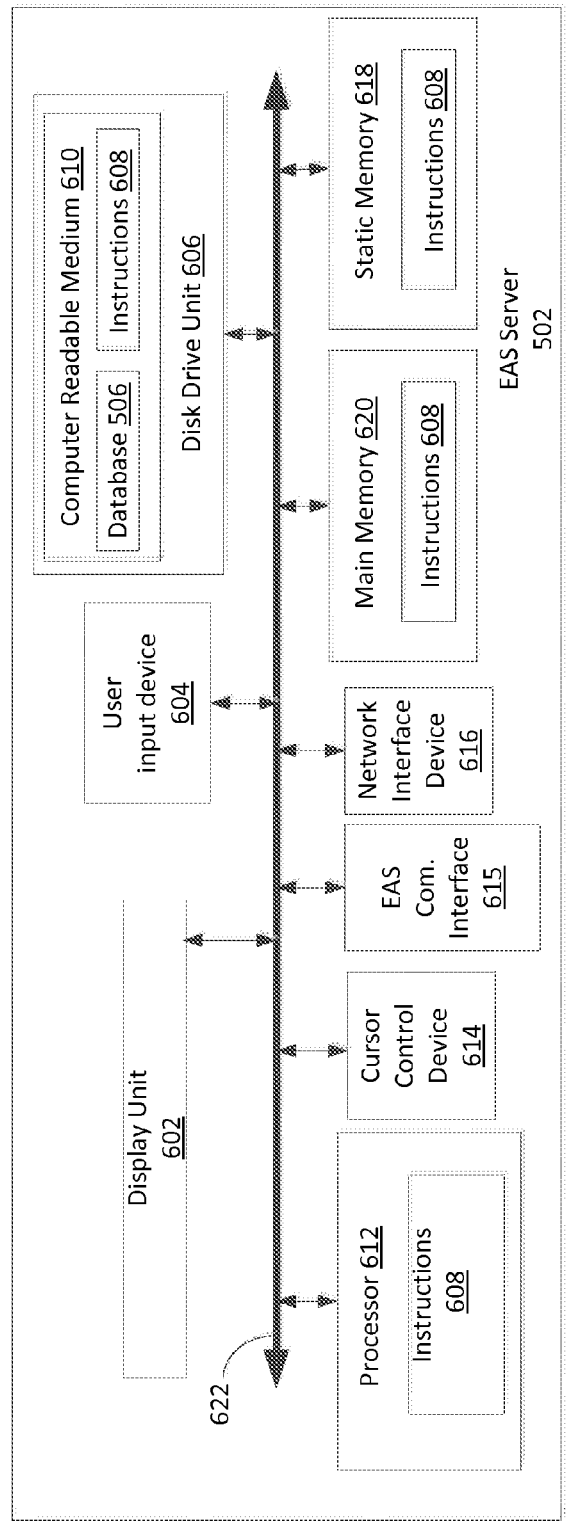
FIG. 6 is a block diagram that is useful for understanding an EAS server which can be used in the present invention.

A block diagram of the EAS server 502 is provided in FIG. 6. The EAS server 502 includes a processor 612 (such as a central processing unit (CPU), and can optionally include a separate dedicated video processing unit (not shown). The EAS server also includes a disk drive unit 606, a main memory 620 and a static memory 618, which communicate with each other via a bus 622. The server 502 can further include a display unit 602, such as a video display (e.g., a liquid crystal display or LCD), a flat panel, or a solid state display. The server 502 can also include a user input device 604 (e.g., a keyboard), a cursor control device 614 (e.g., a mouse) and a network interface device 616 for communicating with a computer network.

The disk drive unit 606 includes a computer-readable storage medium 610 on which is stored one or more sets of instructions 608 (e.g., software code) configured to implement one or more of the methodologies, procedures, or functions described herein. The instructions 608 can also reside, completely or at least partially, within the main memory 620, the static memory 618, and/or within the processor 612 during execution thereof by the computer system. The main memory 620 and the processor 612 also can constitute machine-readable media.

The EAS server 502 has access to a database 506 containing biometric models which are useful for identifying specific individuals based on information representative of a facial image. The database can be stored in a disk drive unit 606 or in a separate memory device which is accessible to the EAS server. The database 506 is created by collecting facial image data (e.g. in the form of biometric models) for specific persons who are known to have triggered EAS alarms in the past. The database can be populated using techniques as hereinafter described in relation to FIG. 7. More particularly, the database is advantageously populated with facial information concerning persons who have triggered EAS alarms at a retail store location. In some embodiments, the data may be limited to persons who have triggered an EAS alarm at a particular secured facility 500. Alternatively, the database can be populated with facial information concerning persons who have triggered EAS alarms at a group of secured facilities 500 comprising a plurality of retail store locations of a particular retail store chain.

Figure 7:
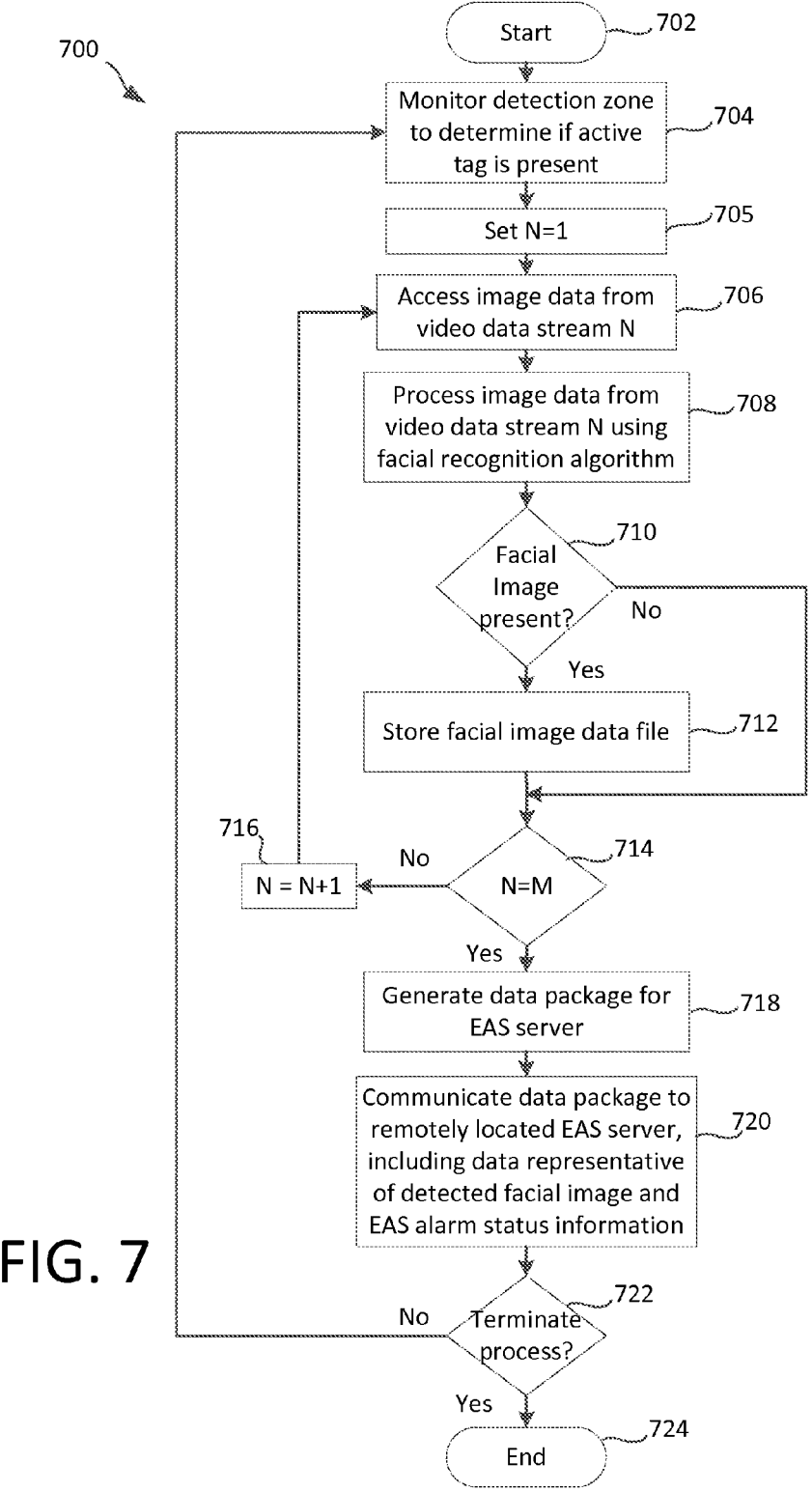
FIG. 7 is a flowchart that is useful for understanding and embodiment of the invention.

In a further alternative embodiment, the database 506 can be populated with facial information concerning persons who have triggered EAS alarms at a plurality of secured facilities 500 participating in a facial image data collection process as described in relation to FIG. 7. Such secured facilities 500 may or may not be related to one another as part of the same business unit or retail store chain. Accordingly, facial image data concerning persons who have triggered and EAS alarm can be collected at a plurality of secured facilities 500 (which may be separate retail store chains, and/or separate retail business entities) that have adopted systems incorporating the inventive arrangements as described herein). Regardless of the specific method used to assemble and maintain the database, it will contain information suitable for not just recognizing faces (facial recognition), but for actually identifying specific known individuals (facial identification) based on facial features.

Referring now to FIG. 7 there is provided a flowchart 700 that is useful for understanding how facial image data is collected in an embodiment of the invention. The process begins at 702 and continues at step 704 where a detection zone 304 is monitored to determine if an active EAS tag is present. Computer software included in EAS detection module 420 is advantageously used to facilitate EAS monitoring. The monitoring can be performed continuously, on a periodic basis, or in any other suitable manner as is known to those skilled in the art. For example, in some embodiments the monitoring at step 704 can continue during steps 705-720 as hereinafter described. The results of the monitoring at step 704 are temporarily stored in a memory of the system controller 110. For example, the EAS monitoring result can be stored in a memory 418 together with a time stamp which specifies a time when an active tag was detected. The time stamp can be determined based on a time value provided by clock 425.

At step 705, an index value N is set to a value of one. The index value N in this exemplary embodiment refers to a particular video data stream generated by one of the imaging devices 108a, 108b, 108c, 108d. Accordingly, N=1 could refer to a video data stream generated by imaging device 108a, N=2 could refer to a video data stream generated by imaging device 108b, and so on. At step 706, the processor 416 will access image data from a video data stream N. For example, if N=1, the processor 416 will access video buffer memory 414 to obtain image data generated by imaging device 108a. The process continues to step 708 in which the processor 416 analyzes the image data using a facial recognition algorithm (e.g. a facial recognition module included with face recognition module 422). As a result of such analysis, the processor will determine at step 710 whether a facial image is present in an image represented by the image data. As used herein, the term "facial image" refers to an image which includes a face of person. Notably, this step will not involve identification of a particular person, but rather a determination of whether a human face is present in the image.

If no facial image is determined to be present in step 710 (710: No), then the process continues directly on to step 716. However, if a facial image is found within the captured image (710: Yes), the processor stores a facial image data file 802a. The facial image data file 802a will include data sufficient to allow an EAS server 502 to perform an identification of a person based on the facial image. In some embodiments, such data can comprise an original or compressed version of the actual image in a suitable image file format. A single image is generally comprised of a greatly reduced amount of data as compared to continuously streaming video. Accordingly, the extraction of a facial image from the video data stream at the EAS detection system 100 will greatly reduce the amount of data that must be communicated to the EAS server 502. Consequently, an amount of communication bandwidth needed for implementing the facial identification feature herein will be greatly reduced as compared to a system in which streaming video is communicated from the EAS pedestal to a central server 502.

In order to achieve a further reduction in required communication bandwidth, the data communicated to the EAS server 502 can be comprised of selected values which define certain biometric facial features. Such data can be extracted by the processor 416 based on the image data which has been captured. An advantage of extracting such facial feature information at processor 416 is that it can potentially further reduce the amount of data which must be communicated to the EAS server 502 as compared to communicating a compressed image file. The facial image data file 802a can also include a time stamp indicating when the image data was obtained, and information specifying which imaging device was the source of the image data.

The method continues on to step 714 where a determination is made as to whether image data from all M video data streams has been analyzed. For example, in the embodiment shown in FIG. 3, the value of M would be 4, corresponding to the four imaging devices 108a, 108b, 108c, 108d. If image data from all of the video data streams has not been analyzed (714: No) then the value of N is incremented in step 716 and the process returns to 706. Steps 706-716 are repeated until image data from all N video streams has been analyzed. During this process, additional facial image data files (e.g. facial image data files 802b, 802c) can be stored in memory if facial images are recognized by the processor 416.

Figure 8:
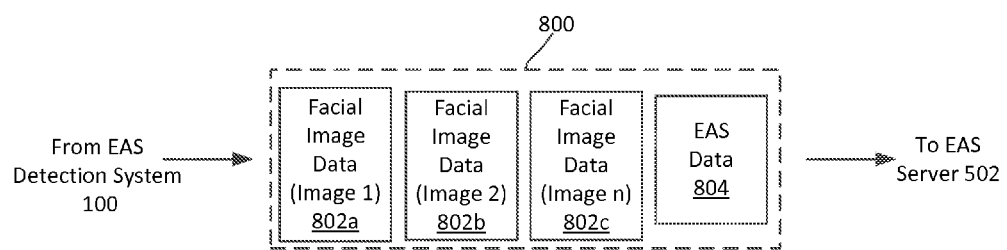
FIG. 8 is a diagram that is useful for understanding a data package that is communicated from an EAS detection system to an EAS server.

Once all of the video streams have been analyzed, (714: Yes) the processor 416 will generate in step 718 a data package for the EAS server. The data package will have a predetermined format. An exemplary data package 800 is shown in FIG. 8 and includes at least a facial image data file 802a and EAS data 804. The data package can also include additional facial image data files (e.g. 802b, 802c). If the facial image data file is to include facial feature information which has been extracted from the image, such information can optionally be combined in a single facial image data set, in which mean or average values representing facial feature information is included. Such values can be obtained by processor 416 by processing feature information extracted from two or more images obtained by the same or different imaging device 108a-108d. The processed information can then be included in the data package 800 as a single facial image data file.

The EAS data 804 can specify information useful for processing and classifying the image data. For example, the EAS data 804 can specify a particular EAS detection system $100_1$-$100_n$ from which the EAS data package 800 originated, the particular imaging device 108a-108b from which the image was obtained, whether or not an active tag has been determined to be present within an EAS detection zone during a time period concurrent with the capture of the facial image data, the time and date when such active tag has been identified. Notably, a facial image captured during a time period concurrent with detection of an EAS tag in a detection zone will be linked or bound to the EAS tag detection event. The actual length of the time period can be chosen to ensure that the captured facial image correctly corresponds to the person who is responsible for triggering the tag detection event. Increasing the time period allows a greater number of facial images to be generated, with some presumably more suitable for facial recognition than others. But the time period must not be too long or it will potentially capture facial images of persons not responsible for triggering the EAS event. A time period of one to two seconds will generally be adequate, but the invention is not limited in this regard.

Those skilled in the art will appreciate that in certain types of EAS systems a tag which is detected in an EAS detection zone can be associated with a particular item of merchandise, or a particular class of merchandise. When such a tag is detected in the detection zone, it will identify the unauthorized item which is present in the detection zone. In such a scenario, the information concerning the merchandise item or class of item can be communicated to the EAS terminal as part of the EAS data 804. Once the data package has been assembled in step 718 as described herein, the data package 800 is communicated in step 720 to the EAS server 502. The communication of the data package can be accomplished using a suitable communication link (e.g. communication link $504_1$-$504_n$).

In step 722 a determination is made as to whether the process 700 should be terminated. If so (722: Yes), then the process terminates in step 724. Otherwise, the process returns to step 704 and the process continues with further EAS monitoring and video image processing as previously described.

Figure 9:
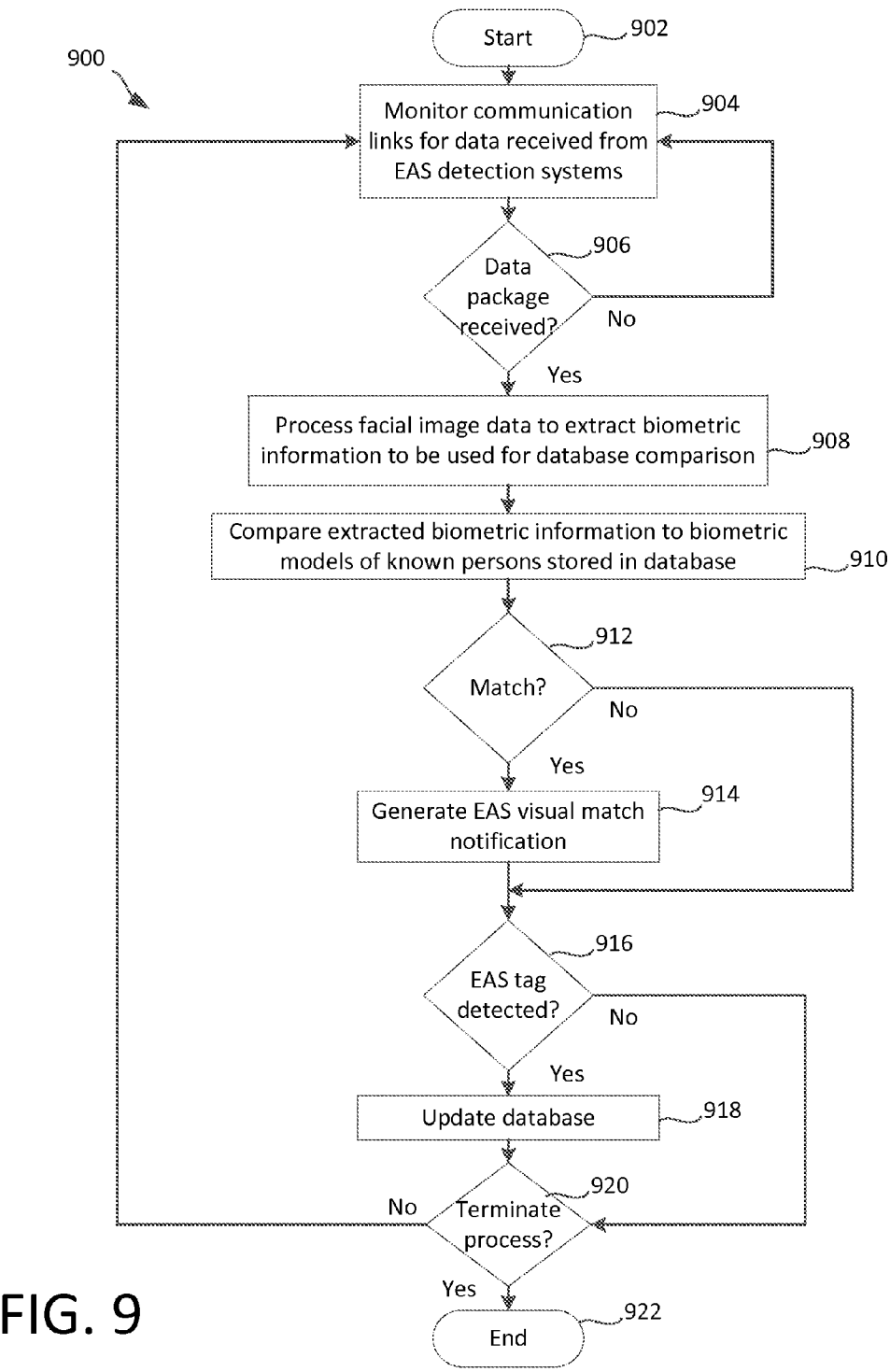
FIG. 9 is a flowchart that is useful for understanding alternative embodiment of the invention.

There is shown in FIG. 9 an exemplary process 900 which is useful for understanding the facial identification processing performed at EAS server 502, and the manner in which the facial image database 506 is populated. The process begins in step 902 and continues with step 904 where the EAS server 502 monitors data inputs received from EAS detection systems $100_1$-$100_n$ by way of communication links $504_1$-$504_n$. At step 906 a determination is made as to whether a data package 800 has been received from one of the EAS detection systems. If so (906: Yes), then the process continues on to step 908 at which point facial image data (e.g. facial image data 802a, 802b, 802c) is processed to extract biometric facial information. The biometric information which is extracted in step 908 is selected so that it is suitable for comparison to biometric models of known individuals as stored in database 506. Any suitable biometric extraction method can be used for this purpose. Subsequently, in step 910 the extracted biometric data from a data package 900 is compared in step 910 to biometric models stored in database 506.

In step 912 a determination is made as to whether the biometric information extracted in step 908 can be matched to a biometric model of a known individual stored in database 506. A determination that a match has occurs will be based on this comparison step in accordance with a particular facial identification algorithm used by the EAS server. One skilled in the art will appreciate that numerous facial identification methods are possible for purposes of matching biometric information extracted from an image to biometric models stored in a database. Any suitable matching process can be used in step 912 without limitation, provided that it is capable of identifying a biometric model of a particular person based on the available image data contained in facial image data (e.g. facial image data 802a, 802b, 802c).

It should be appreciated that the facial identification processing performed at the EAS server 502 in step 912 is different as compared to facial recognition processing performed at the system controller 110 at step 710. The facial recognition processing performed at step 710 by the system controller 110 generally involves a determination that a human face is present within an image, but does not involve any attempt to match that particular face to a particular person (e.g. by comparison to biometric information associated with the face of a particular person as stored in a database 506). In contrast, the facial identification processing performed in step 912 at the EAS server 502 will involve processing which is intended to identify a particular person. This identification processing is based on a comparison of biometric data extracted from the facial image captured in real time at the pedestal to biometric models which are stored in a database (e.g. database 506). When there is a sufficient match between biometric data extracted from the facial image and the biometric models stored in the database, a match can be declared. Still, it should be appreciated that identification of a particular person as described herein does not necessarily involve determining personal information such as their name, but is instead a process of associating a captured facial image for that person to a biometric model for that person which was previously stored in the database. Accordingly, a person can be "identified" as a known person even without knowledge of their name, or other non-biometric identifying information.

If a match is found (912: Yes), then the process continues on to step 914 where an EAS visual match notification is generated. The notification can include any type of audible or visual alert suitable to inform employees of the secured facility that a person has been identified who is known to have previously triggered one or more EAS alarms. The notification described herein is advantageously a predictive notification of potential theft insofar as it predicts that a person is likely to commit an act of theft. A predictive notification could be simple alerting function (e.g. a silent alarm, audible alarm or visual alarm). However, it is advantageous for the predictive notification to include at least some information which will indicate the level of theft risk associated with a person who has triggered the alarm. Such information can include the number of occasions that the person has triggered an EAS alarm in the past, or an EAS score which evaluates the risk of a particular person based on a variety of theft risk factors. The theft risk factors can be selected from the group consisting of a number of the EAS tag detection events, a number of store visits, and a value of merchandise indicated by the EAS tag detected.

Notably, the EAS data 804 can specify the source imaging device from which the facial image data is obtained. If this information is provided, the EAS server will use it to advantageously determine whether an identified person was detected entering or leaving the secured facility 500. For example, in the system shown in FIG. 3, it can be inferred by server 502 that facial images captured by imaging devices 108c, 108d corresponds to persons entering the secured facility, since the fields of view C and D for those imaging devices are directed toward the entry/exit 104. Conversely, the server 502 can infer that facial images captured by imaging devices 108a, 108b correspond to persons leaving the secured facility, since fields of view A and B for those imaging devices are directed toward the interior of the premises.

In some embodiments, the notification at 914 can be provided on a computer display unit 602 which is accessible to store employees. Accordingly, the notification can specify whether the identified person is entering or leaving the premises. This information can then be displayed on the computer display unit (e.g. computer display unit 602). The notification can also include a digital data file including the facial image of the person who has been identified. The facial image can optionally be displayed on the computer display unit so that store employees (or security personnel) will be able to recognize the person of interest who has been identified.

The database 506 will advantageously contain information beyond that which is needed for simply identifying a particular person based on a facial identification match. For example, the database can include detailed information which specifies the number of occasions that a particular person corresponding to a stored biometric model has triggered EAS alarms and the previous dates when such EAS alarms were triggered. In such a scenario, this information can be communicated to employees as part of the notification communicated in step 914. Subsequently, such information can be communicated to store employees by means of a visual interface, such as display unit 602.

According to another aspect of the invention, the database 506 can include information concerning the previous items or class of items that was detected in a detection zone 304 when the identified person previously triggered an EAS alarm. For example, in an EAS detection system using RFID tags, the tag which is detected in an EAS detection zone 304 can specify the product or class of product to which the tag is attached. In such a scenario, this information can be communicated to the EAS server 502 as part of EAS data 804. The information can then be stored in the database 506 in association with a biometric model corresponding to the face of a particular person who triggered the EAS alarm. Subsequently, the information concerning the types of merchandise previously detected in the EAS detection zone can be specified in the notification generated at step 914. This information can then be displayed on a visual interface, such as display unit 602. Information concerning specific products or types of merchandise previously detected can be useful for predicting future illicit behavior of the identified person. For example, if the database information indicates that the individual has previously triggered EAS alarms on five separate occasions, and on each such occasion the EAS tag corresponded to a certain type of item (e.g., jewelry), then the store employees could focus their attention on the store displays (e.g. a jewelry counter) associated with that particular item. The obvious presence and attention of the store employees at such locations will inhibit theft of the particular items known to be of interest to a particular person.

The processing performed at the EAS server continues at step 916 by determining whether the EAS data 804 indicates that an EAS tag has been detected. If so, then the database 506 is updated with new information. If a biometric model for a particular person already exists in the database (912: Yes) then the update to the database at 918 will involve modifying the information associated with that record. For example, the information can be modified or updated in step 918 to record a date and time when an EAS tag was detected in an EAS detection zone 304 in association with that person. If the EAS tag can be used to identify a particular item or class of item to which the tag is attached, then the updating step 918 can further involve storing data concerning the item or class of item that was detected in the EAS detection zone. The updating step can also involve storing updated image data associated with the person, or using the newly captured facial image data to improve the quality of an existing biometric model for that person's face.

If there is no match for a particular person's face within the database 506 (912: No), then in step 918 the updating step will involve creating a new database record. The new database record will include the biometric facial model or data for the particular face which has been captured in association with an EAS tag detection. A biometric facial model is associated with an EAS tag detection when a corresponding facial image was captured during a time period associated with a detected presence of the EAS tag in the detection zone. The new database record can also include the date/time of the EAS tag detection, and the merchandise item or class of item associated with a particular EAS tag detected in the EAS detection zone 304. After the database has been updated in step 918, the process continues on to step 920 where a determination is made as to whether the process is to be terminated. If so, the process terminates at 922; otherwise, the process returns to 904 where the process continues.

In an alternative embodiment of the invention, the database updating in step 918 is not conditioned on a positive occurrence of an EAS tag detection in step 916. Accordingly, an existing database record can be updated regardless of whether an EAS tag has been detected. A database record for a person who has triggered an EAS alarm at least once will then be updated each time that person is identified as entering the premises of a secured facility. On some visits to the secured facility, the person may not trigger the EAS alarm and this information can be recorded in association with the facial biometric data record for such person. Likewise, when the person triggers an EAS alarm, that information can also be updated within the database 506. Over time, a pattern will emerge which will indicate the relative frequency with which the particular person triggers the EAS theft alarm. This pattern can be characterized by an EAS theft risk score or average. The score can specify the theft risk posed by the particular person based on their past behavior.

For example a person who triggers an EAS alarm on 49 out of 50 visits to one or more secured facilities will have a very high score (e.g. 98%) indicating that the person is highly likely to engage in theft on any particular visit to the secure facility. Such a person is a high risk person and may justify an immediate request for the presence of security personnel. A score of 50% would be assigned to a person who triggers an EAS alarm roughly half of the time when they visit a secured facility, and may require careful watching. Conversely, a very low score (e.g. 5%) may indicate that the person on average triggers EAS alarms only rarely. Such a score may indicate that the person is not likely to engage in merchandise theft and does not require presence of security personnel.

The scoring process can also be used to remove records from the database as needed. For example, the presence of the particular person within the database may have been caused by electrical noise, or a clerk's failure to remove an EAS tag. Over time, persons with very low EAS scores can be removed from the database. EAS scores can be determined using any suitable algorithm to account for the frequency of their store visits and other behavior. For example, a person who visits a store once and triggers an EAS alarm once would have a 100% EAS alarm trigger average but may not present a particularly high theft risk. Accordingly, the EAS score as described herein can be adjusted to account for this. According to another aspect of the invention, the EAS theft risk score can be adjusted in accordance with the value of the merchandise associated with previous EAS tag detections. If on previous occasions, the EAS tag detected in a detection zone in association with a particular person was attached to a high value item, then that person's EAS score could be increased as appropriate.

From the foregoing it will be appreciated that the database 506 is updated in step 918 using information collected by an EAS detection system 100. This updated information can be shared with other EAS servers 502 using any suitable method. For example, an EAS server 502 can periodically communicate updated information in its database 506 to a remotely located central server (not shown) which maintains a master database containing biometric facial data for persons who have triggered EAS alarms. Any suitable data communication method can be used for this purpose. Once the updated information has been received, the central server can then use the information to update EAS servers 502 for other secured facilities 500. Specifically, the updated information concerning biometric models, EAS tag detection dates/times, merchandise classification, etc. can be shared by the central server with a plurality of other EAS servers. For example, the updated data can be provided to all secured facilities 500 of a particular retail store chain, a plurality of secured facilities 500 within a particular shopping center, or a plurality of secured facilities 500 within a particular geographic area. Any suitable method can be used for performing data synchronization among the a plurality of databases 506 maintained by a plurality of EAS servers 502.

Facial identification processing is known in the art and therefore will not be described here in detail. However, those skilled in the art will appreciate that facial identification processing will involve processing performed by the EAS server 502 to identify a particular person corresponding to the one or more facial image data files (e.g. facial image data files 802a, 802b, 802c). Any suitable facial identification process can be used for this purpose. For example, in an embodiment of the invention, the EAS server will compare facial feature information (based on the facial image data files) to facial feature information stored in a database and corresponding to certain known persons. In effect, the EAS server will perform an analysis of data representative of the facial image to determine if it comprises a biometric match relative to at least one biometric model of a facial image stored in a database. As a result of such processing, the EAS server will either identify a person or determine that the information contained in the facial image data file does not comprise a match to facial image data for any known person stored in its database. Those skilled in the art will appreciate that a biometric match as referenced herein need not be an actual exact match of biometric data stored in a database relative to biometric data extracted from a facial image. Instead, a biometric match can declared where the captured facial image satisfies a predetermined measure of similarity of facial features relative to a biometric model for a particular person. This sufficient level of similarity can be deemed to be a "match" for purposes of the present invention even though an exact match may not exist. This arrangement facilitates facial identification in scenarios where he biometric models stored in the database and/or the facial images collected do not perfectly represent a face of a particular person.

Those skilled in the art will appreciate that accuracy of facial recognition systems is enhanced by obtaining good quality images that fully and accurately facilitate extraction of feature information. Still, it is desirable for a facial recognition system to remain unobtrusive. These competing requirements can create challenges with regard to camera placement. The problem is complicated by the need in many instances to have facial image data from two or more camera angles with respect to a target individual. This problem is solved in the present invention by placing imaging devices directly on the EAS pedestals. This placement positions the cameras at the optimum height for facial recognition software (approximately 60 inches) and directly in the path of pedestrian ingress and egress. The cameras and faces of target persons (typically pedestrians) are in a substantially parallel orientation to each other. This provides a more frontal view of the target individual's faces that is more suitable for facial identification as compared to the oblique camera angles which are prevalent when cameras are mounted at other locations. Imaging devices 108a-108h can be arranged to capture images of a person's face from a selection of viewing directions that are deemed optimal for facial image recognition and identification.

A significant advantage of the system and methods described herein concerns the reduction in bandwidth required for facilitating enhanced EAS operations. Facial recognition processing is performed using the control system 110 located at the EAS pedestal. Conversely, facial identification processing is performed for one or more EAS detection systems 100 at a remotely located EAS server. This approach reduces the need for expensive and substantial processing resources at the EAS pedestal 100, while also minimizing system bandwidth requirements. Bandwidth requirements are reduced by eliminating the need for streaming video from numerous EAS pedestal locations to the central EAS server 502. The foregoing features facilitate integration of a facial identification feature into an EAS pedestal system with minimal additional expense.

Those skilled in the art will appreciate that the system controller architecture illustrated in FIG. 4 and the EAS server architecture in FIG. 6 each represent one possible example of a system architecture that can be used with the present invention. However, the invention is not limited in this regard and any other suitable architecture can be used in each case without limitation. Dedicated hardware implementations including, but not limited to, application-specific integrated circuits, programmable logic arrays, and other hardware devices can likewise be constructed to implement the methods described herein. It will be appreciated that the apparatus and systems of various inventive embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further reductions in communication bandwidth requirements can be effected by shifting additional processing responsibilities from the EAS server 502 to the EAS detection system 100. For example, in some embodiments of the invention, facial identification processing as described herein can be performed at system controller 110. In such embodiments, the database 506 is provided at the EAS server and can be accessed by system controller 110. In some embodiments, the database 506 can also be provided within memory 418. If facial identification processing is performed at system controller, then the face recognition module 422 can include software algorithms which facilitate facial identification processing. In such an embodiment, the EAS visual match notification 914 would be generated by the processor 416 at system 110. The EAS server can be omitted in such a scenario, or it can serve as a central communication hub for updating the facial identification data which is contained within the database 506. For example, updated facial identification data can be communicated from the EAS server 502 to each EAS detection system 100 using communication links 504$_1$-504$_n$.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for predictive theft intervention at a secured facility, comprising:
   generating image data using at least one imaging device;
   processing the image data in a computer processing device to recognize the presence of a facial image comprising a face of a person within the image data;
   performing an analysis of data representative of the facial image to determine a biometric match relative to at least one of a plurality of biometric models of facial images stored in a database;
   generating at least one predictive notification of a future potential theft of merchandise from the secured facility responsive to a determination of the biometric match; and
   storing in the database information concerning one or more occurrences of EAS tags being detected in an EAS detection zone and respectively associating each occurrence with at least one of the biometric models.

2. The method according to claim 1, wherein the information specifies a quantity of the occurrences which are associated with each the biometric model.

3. The method according to claim 1, wherein the information specifies a merchandise item or class of merchandise which was attached to the EAS tag detected.

4. The method according to claim 1, wherein the information specifies a value of merchandise which was attached to an EAS tag detected during each the occurrence.

5. A method for predictive theft intervention at a secured facility, comprising:
   generating image data using at least one imaging device;
   processing the image data in a computer processing device to recognize the presence of a facial image comprising a face of a person within the image data;
   performing an analysis of data representative of the facial image to determine a biometric match relative to at least one of a plurality of biometric models of facial images stored in a database;
   generating at least one predictive notification of a future potential theft of merchandise from the secured facility responsive to a determination of the biometric match; and
   calculating an EAS score for one or more of the biometric models stored in the database, the EAS score specifying a theft risk associated with a person identified by the biometric model.

6. The method according to claim 5, further comprising calculating the EAS score for each biometric model based on one or more theft risk factors attributed to the biometric model, the theft risk factors selected from the group consisting of a number of the EAS tag detection events, a number of store visits, and a value of merchandise indicated by the EAS tag detected.

7. A system for predictive theft intervention at a secured facility, comprising:
   at least one imaging device arranged to generate image data;
   at least one computer processing device configured to
     recognize the presence of a facial image comprising a face of a person within the image data,
     perform an analysis of data representative of the facial image to determine a biometric match relative to at least one of a plurality of biometric models of facial images stored in a database, generate at least one predictive notification of a future potential theft of merchandise from the secured facility responsive to a determination of the biometric match, and store in the database information concerning one or more occurrences of EAS tags being detected in an EAS detection zone and to respectively associate each the occurrence with at least one of the biometric models.

8. The system according to claim 7, wherein the information specifies a quantity of the occurrences which are associated with each the biometric model.

9. The system according to claim 7, wherein the information specifies a merchandise item or class of merchandise which was attached to the EAS tag detected.

10. The system according to claim 7, wherein the information specifies a value of merchandise which was attached to an EAS tag detected during each the occurrence.

11. A system for predictive theft intervention at a secured facility, comprising:

at least one imaging device arranged to generate image data;

at least one computer processing device configured to
recognize the presence of a facial image comprising a face of a person within the image data, perform an analysis of data representative of the facial image to determine a biometric match relative to at least one of a plurality of biometric models of facial images stored in a database, generate at least one predictive notification of a future potential theft of merchandise from the secured facility responsive to a determination of the biometric match, and calculate an EAS score for one or more of the biometric models stored in the database, the EAS score specifying a theft risk associated with a person identified by the biometric model.

12. The system according to claim 11, wherein the at least one processor is configured to calculate the EAS score for each biometric model based on one or more theft risk factors attributed to the biometric model, the theft risk factors selected from the group consisting of a number of the EAS tag detection events, a number of store visits, and a value of merchandise indicated by the EAS tag detected.

* * * * *